(12) United States Patent
Gaspar et al.

(10) Patent No.: US 11,099,852 B2
(45) Date of Patent: Aug. 24, 2021

(54) APPARATUS AND METHOD FOR MAINTAINING PREDICTION PERFORMANCE METRICS FOR PREDICTION COMPONENTS FOR EACH OF A PLURALITY OF EXECUTION REGIONS AND IMPLEMENTING A PREDICTION ADJUSTMENT ACTION BASED THEREON

(71) Applicant: Arm Limited, Cambridge (GB)

(72) Inventors: Francisco João Feliciano Gaspar, Cambridge (GB); Mohammadi Shabbirhussain Bharmal, Cambridge (GB)

(73) Assignee: ARM LIMITIED, Cambridge (GB)

( * ) Notice: Subject to any disclaimer, the term of this patent is extended or adjusted under 35 U.S.C. 154(b) by 187 days.

(21) Appl. No.: 16/170,383

(22) Filed: Oct. 25, 2018

(65) Prior Publication Data

US 2020/0133675 A1   Apr. 30, 2020

(51) Int. Cl.
*G06F 9/38* (2018.01)

(52) U.S. Cl.
CPC .......... *G06F 9/3848* (2013.01); *G06F 9/3804* (2013.01); *G06F 9/3844* (2013.01)

(58) Field of Classification Search
CPC .............................. G06F 9/3844; G06F 9/3848
USPC ....................................................... 712/227
See application file for complete search history.

(56) References Cited

U.S. PATENT DOCUMENTS

| | | | | | |
|---|---|---|---|---|---|
| 5,937,203 | A * | 8/1999 | Lee | ..................... | G06F 9/30036 703/21 |
| 6,055,650 | A * | 4/2000 | Christie | .................. | G06F 9/383 710/15 |
| 6,963,954 | B1 * | 11/2005 | Trehus | ................ | G06F 12/0215 711/137 |
| 8,516,226 | B1 * | 8/2013 | Collard | ................. | G06F 9/3808 711/137 |
| 2006/0277397 | A1 * | 12/2006 | Sartorius | ............... | G06F 9/3844 712/240 |
| 2007/0239940 | A1 * | 10/2007 | Doshi | ................. | G06F 12/0862 711/137 |

(Continued)

OTHER PUBLICATIONS

H. Vandierendonck and A. Seznec. Fetch gating control through speculative instruction window weighting. In HiPEAC, p. 120-135 (Year: 2007).*

*Primary Examiner* — Keith E Vicary
(74) *Attorney, Agent, or Firm* — Nixon & Vanderhye, P.C.

(57) ABSTRACT

An example apparatus comprises instruction execution circuitry and fetch circuitry to fetch, from memory, instructions for execution by the instruction execution circuitry. The fetch circuitry comprises a plurality of prediction components, each prediction component being configured to predict instructions in anticipation of the predicted instructions being required for execution by the instruction execution circuitry. The fetch circuitry is configured to fetch instructions in dependence on the predicting. The apparatus further comprises prediction tracking circuitry to maintain, for each of a plurality of execution regions, a prediction performance metric for each prediction component. The fetch circuitry is configured, based on at least one of the prediction performance metrics for a given execution region, to implement a prediction adjustment action in respect of at least one of the prediction components.

18 Claims, 6 Drawing Sheets

(56) References Cited

U.S. PATENT DOCUMENTS

| | | | |
|---|---|---|---|
| 2008/0256345 A1* | 10/2008 | Bose | G06F 9/3806 712/239 |
| 2009/0063819 A1* | 3/2009 | Doing | G06F 9/3804 712/205 |
| 2011/0047357 A1* | 2/2011 | Stempel | G06F 9/3861 712/220 |
| 2011/0173433 A1* | 7/2011 | Ford | G06F 11/3466 713/100 |
| 2012/0303938 A1* | 11/2012 | Chen | G06F 9/38 712/240 |
| 2018/0121203 A1* | 5/2018 | Ishii | G06F 9/3806 |
| 2019/0004961 A1* | 1/2019 | Boggs | G06F 9/3842 |

\* cited by examiner

APPARATUS AND METHOD FOR MAINTAINING PREDICTION PERFORMANCE METRICS FOR PREDICTION COMPONENTS FOR EACH OF A PLURALITY OF EXECUTION REGIONS AND IMPLEMENTING A PREDICTION ADJUSTMENT ACTION BASED THEREON

BACKGROUND

Technical Field

The present technique relates to the field of processing devices.

Technical Background

Some data processing systems are configured to execute instructions on data. In some such systems, the instructions are stored in a storage, such as a memory, from which they are fetched by fetch circuitry for execution by instruction execution circuitry. In order to improve performance, such fetch circuitry can be configured to predict and fetch instructions in advance of their being required for execution.

Incorrect predictions can reduce system performance, both by way of required (but not predicted) instructions not being fetched before they are needed by the execution circuitry, and by way of not required instructions being predicted and hence fetched, thus taking up storage space (for example in a cache). The performance of incorrect predictions also wastes energy. It would therefore be desirable to improve the performance of the aforementioned prediction.

SUMMARY

At least some examples provide an apparatus comprising:
instruction execution circuitry;
fetch circuitry to fetch, from memory, instructions for execution by the instruction execution circuitry, wherein:
the fetch circuitry comprises a plurality of prediction components, each prediction component being configured to predict instructions in anticipation of the predicted instructions being required for execution by the instruction execution circuitry; and
the fetch circuitry is configured to fetch instructions in dependence on the predicting, and
prediction tracking circuitry to maintain, for each of a plurality of execution regions, a prediction performance metric for each prediction component,
wherein the fetch circuitry is configured, based on at least one of the prediction performance metrics for a given execution region, to implement a prediction adjustment action in respect of at least one of the prediction components.

Further examples provide a method comprising:
fetching, from memory, instructions for execution by the instruction execution circuitry, wherein:
the fetching utilises a plurality of prediction components, each prediction component being configured to predict instructions in anticipation of the predicted instructions being required for execution by instruction execution circuitry; and
the fetching is in dependence on the predicting, and
maintaining, for each of a plurality of execution regions, a prediction performance metric for each prediction component; and
based on at least one of the prediction performance metrics for a given execution region, performing a prediction adjustment action in respect of at least one of the prediction components.

Further aspects, features and advantages of the present technique will be apparent from the following description of examples, which is to be read in conjunction with the accompanying drawings.

DESCRIPTION OF EXAMPLES

A processing apparatus can comprise instruction execution circuitry and fetch circuitry to fetch, from memory, instructions for execution by the instruction execution circuitry. The fetch circuitry comprises a plurality of prediction components, each of which is configured to predict instructions in anticipation of the predicted instructions being required for execution by the instruction execution circuitry. Such prediction improves processing performance by enabling the fetch circuitry to fetch instructions ahead of them being needed by the execution circuitry, hence reducing the need for the execution circuitry to wait to receive instructions to execute.

One example of such a prediction component is instruction prefetch circuitry to prefetch instructions into a cache storage of the apparatus. The prefetching may be based on extrapolation of a pattern of instructions retrieved from memory. For example, where a series of instructions are fetched from regularly-spaced memory addresses, the regular spacing may be extrapolated into the future on the expectation that the pattern will continue.

Another example of such a prediction component is branch prediction circuitry for predicting branch instructions. A branch instruction is an instruction that can cause the apparatus to begin executing a different instruction sequence from a currently-executing instruction sequence. In particular, when execution of the branch instruction causes a branch to be taken, processing will jump to execution of an instruction at a target address rather than processing merely proceeding to execute the instruction at the instruction address immediately following the address of the branch instruction. The branch prediction circuitry is configured to predict the outcome of such branch instructions prior to their execution, in order to predict which instructions will be required for execution following execution of the branch instruction.

The fetch circuitry is configured to fetch instructions in dependence on the aforementioned predicting. The fetched predicted instructions can then be provided to the execution circuitry as required.

The apparatus has prediction tracking circuitry that is configured to maintain, for each of a plurality of execution regions, a prediction performance metric for each prediction component. The execution regions may for example be ranges of memory addresses associated with a memory in which instructions are stored. Alternatively or additionally, the execution regions may be execution contexts of the instruction execution circuitry. Examples of such execution contexts include a trust level associated with executed instructions, an exception level of operation of the apparatus, an application identifier associated with executed instructions, and a virtual machine identifier associated with executed instructions.

A granular indication of prediction performance is thereby provided, which reflects potentially differing prediction performance in the different execution regions. For example, the predictions made by a given prediction component may be relatively accurate with respect to instructions in one region of memory, or associated with one particular execution context, but inaccurate with respect to instructions in another region of memory or associated with a different execution context. Such differences would not be identifiable in comparative systems in which only an overall measure of prediction performance, or no measure of prediction performance at all, is stored.

The fetch circuitry is then configured, based on at least one of the prediction performance metrics for a given execution region, to implement a prediction adjustment action in respect of at least one of the prediction components. The behaviour of the prediction components can thus be adjusted based on their performance in each execution region. The given execution region may for example be a current execution region, such that the behaviour of one or more components is adjusted on the fly based on their current performance. The given execution region may, alternatively or additionally, include a non-current execution region such that, for example, the behaviour of the prediction components is adjusted as appropriate when instructions associated with that execution region are executed in the future.

In an example, the fetch circuitry is configured to implement the prediction adjustment action responsive to a determination, based on said at least one of the prediction performance metrics for the given execution region, of poor performance of said at least one prediction component in respect of the given execution region. The prediction can thus be adjusted to take into account the poor performance of one or more prediction components.

The prediction performance metric may for example comprise a numerical representation of prediction accuracy of a corresponding one of said at least one prediction component in the given prediction region. The determination of poor performance may then comprise comparing the corresponding numerical representation of prediction accuracy with a predetermined threshold. Examples of such numerical representations of prediction accuracy include a number of accurate predictions in a given period, a number of inaccurate predictions, and/or a ratio of these (i.e. an accuracy rate).

The prediction adjustment action may include inhibition of the poorly-performing components. Overall system performance can thereby be improved, by removing or reducing the incidence of incorrect predictions. For example, inhibiting a component may comprise deactivating that component such that it is not, at least temporarily, used to provide predictions. Inhibiting a component may alternatively comprise de-emphasising that component relative to other prediction components such that, whilst still being used to provide predictions, the impact of that prediction component is reduced. As another example, inhibiting a component may include reducing a prediction distance of a prediction component, where the prediction distance expresses how many instructions into the future a given component predicts. It can be expected that the effects of poor prediction accuracy become more severe for predictions further into the future: a poorly performing component may still have an acceptable chance of correctly predicting for example the next instruction, but an unacceptably low chance of correctly predicting a given number of instructions into the future. By not allowing a poorly-performing component to predict too far into the future, the effects of this are mitigated. Furthermore, fewer (potentially inaccurately) predicted instructions are fetched for example into a cache, thereby reducing the risk of useful data being evicted from the cache to make space for a large number of (potentially inaccurately) predicted instructions.

In an example, subsequent to the determination of poor performance, the fetch circuitry is configured to implement a further prediction adjustment action responsive to a further determination, based on said at least one of the prediction performance metrics for the given execution region, of acceptable performance of said at least one prediction component in respect of the given execution region. The further prediction adjustment action comprises de-inhibiting said at least one prediction component. A given prediction component can thus be returned to its ordinary un-inhibited operation when its prediction accuracy is deemed to have returned to an acceptable level.

In examples, the prediction tracking circuitry is configured, responsive to a metric adjustment condition, to adjust at least one prediction performance metric maintained by the prediction tracking circuitry to indicate a higher prediction accuracy. For example, a count of incorrect predictions may be decremented. In some examples, all prediction performance metrics are adjusted.

The metric adjustment condition can take a variety of forms, but in one example may be that a periodic time interval has elapsed. One or more prediction performance metrics can thus be periodically adjusted to indicate a higher accuracy, such that an indication of poor performance gradually decays over time. A prediction component that performed poorly, and was therefore inhibited, can thus be de-inhibited after a suitable time has passed.

In an example, the prediction tracking circuitry is configured to update the prediction performance metric, for the given execution region for said at least one prediction component, responsive to prediction accuracy feedback. The prediction accuracy feedback may comprise at least one of an indication of an accurate prediction by said at least one prediction component for the given execution region, and an indication of an inaccurate prediction by said at least one prediction component for the given execution region. The prediction tracking circuitry can thus keep the prediction performance metrics up-to-date based on this feedback, which may for example be received from the prediction components and/or other components within the apparatus such as a cache or the instruction execution circuitry.

As an example, as mentioned above one of the prediction components may be instruction prefetch circuitry. The corresponding prediction performance metric for a given execution region may then comprise a representation of a number of cache misses in respect of that execution region: perfectly accurate prefetch circuitry would prefetch all instructions to the cache before they are required, such that there was never a cache miss in respect of a required instruction. A cache miss thus indicates that the prefetch circuitry made an incorrect prediction, and a count of the number of cache misses indicates the degree of inaccuracy.

Alternatively or additionally, as mentioned above the prediction components may include branch prediction circuitry. For example, there may be a micro branch predictor and a main branch predictor as explained in more detail below. In examples, as explained in more detail below, instructions predicted by the branch prediction circuitry are provided to a queue, such as a fetch queue or issue queue. In such examples, the prediction adjustment action may comprise at least one of reducing the size of a fetch queue of the apparatus and reducing the size of an issue queue of the apparatus. No further predicted instructions can be inserted into the queue when full, and so this reduction of queue size implicitly reduces how far ahead instructions are predicted.

The above-described apparatus can be implemented in dedicated circuitry. For example, the prediction tracking circuitry may be a dedicated component of a processing device.

Alternatively, the prediction tracking circuitry can be implemented as an extension of circuitry having functionality other than prediction tracking. This allows the prediction tracking functionality to be implemented within circuitry that already exists for another purpose, providing efficiency and also improved ease of implementation. This can be particularly efficiently implemented in circuitry that is already capable of storing execution-region-specific data.

One example of such an existing structure is a translation lookaside buffer (TLB), such as a main TLB or a micro-TLB within the fetch circuitry, which buffers virtual-to-physical address translation information for a number of memory pages. Each memory page corresponds to a range of memory addresses and thus can be seen as an execution region. The translation lookaside buffer can thus be extended to store prediction performance metrics, associated with prediction components, for each memory page therein.

Another example of such an existing structure is a cache or cache way tracker which can be extended to track prediction performance associated with each cache line, or region of cache lines, stored therein.

A further example of such an existing structure is a call return stack, which stores return address information for context based regions. For example, each context may correspond to a subroutine. The stack functionality can be expanded to track prediction performance associated with each such context.

Another example of such an existing structure is a global region tracker, which stores data associated with relatively large (multi-megabyte) regions of memory. Each such region can be considered an execution region, and the global region tracker functionality can be extended to track prediction performance metrics associated therewith.

In some such examples, multiple of these existing structures are extended to store prediction metrics. Some of these corresponding regions (e.g. cache lines) are smaller than others (e.g. the large memory regions of the global region tracker), and so such an apparatus may be configured such that prediction performance metrics stored in structures with smaller associated regions take precedence over those stored in structures with larger associated regions.

Examples of the present disclosure will now be described with reference to the Figures.

Figure 1:
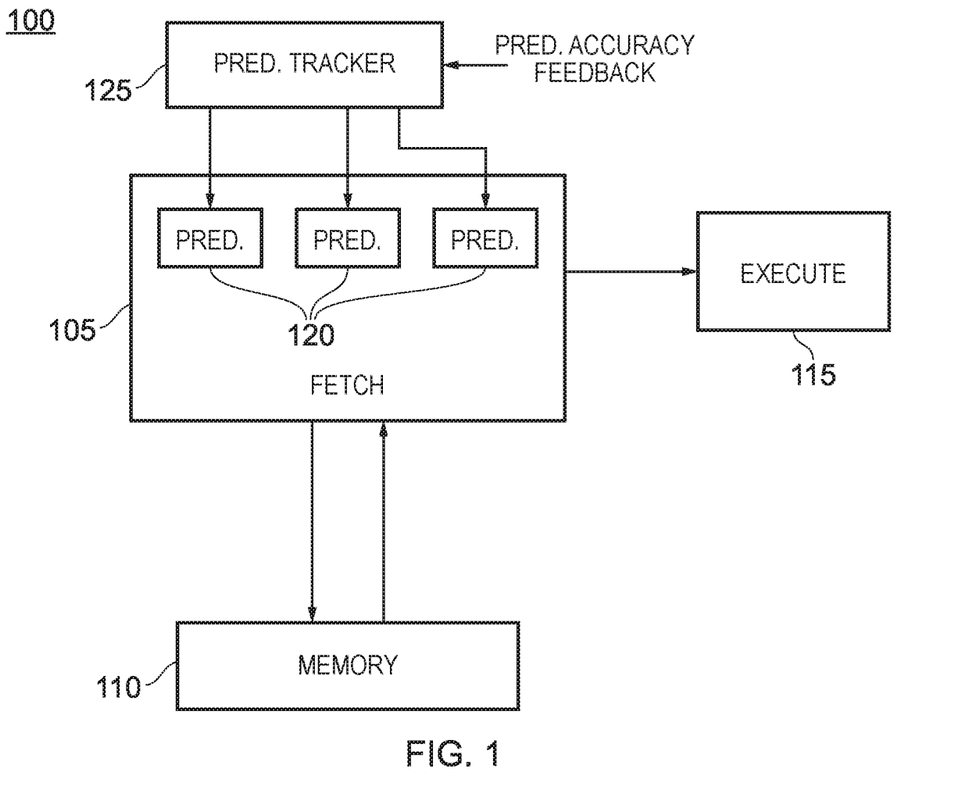
FIG. 1 shows a processing apparatus.

FIG. 1 shows a processing apparatus 100 according to examples of the present disclosure. The apparatus 100 comprises fetch circuitry 105, a memory 110 and execute circuitry 115. The fetch circuitry 105 is configured to fetch instructions from a memory 110 and provide the fetched instructions to the execute circuitry 115 for execution.

The fetch circuitry 105 comprises three prediction components 120. Each prediction component 120 is configured to predict instructions in anticipation of them being required for execution by the execution circuitry 115. The fetch circuitry 105 can thus fetch the predicted instructions before they are required so that, when they are required, the latency associated with providing them to the execution circuitry 115 is reduced. Each prediction component 120 applies a different type of prediction. For example, the prediction components 120 may include a prefetcher, a micro branch predictor and a main branch predictor as described in more detail below in relation to FIG. 2.

The apparatus 100 further comprises a prediction tracker 125. The prediction tracker 125 receives prediction accuracy feedback relating to the accuracy of the prediction components 120. Based on this feedback, the prediction tracker 125 applies prediction adjustment actions to the prediction components 120. For example, if one prediction component 120 is determined to have low accuracy, that component can be inhibited relative to the other components.

Figure 2:
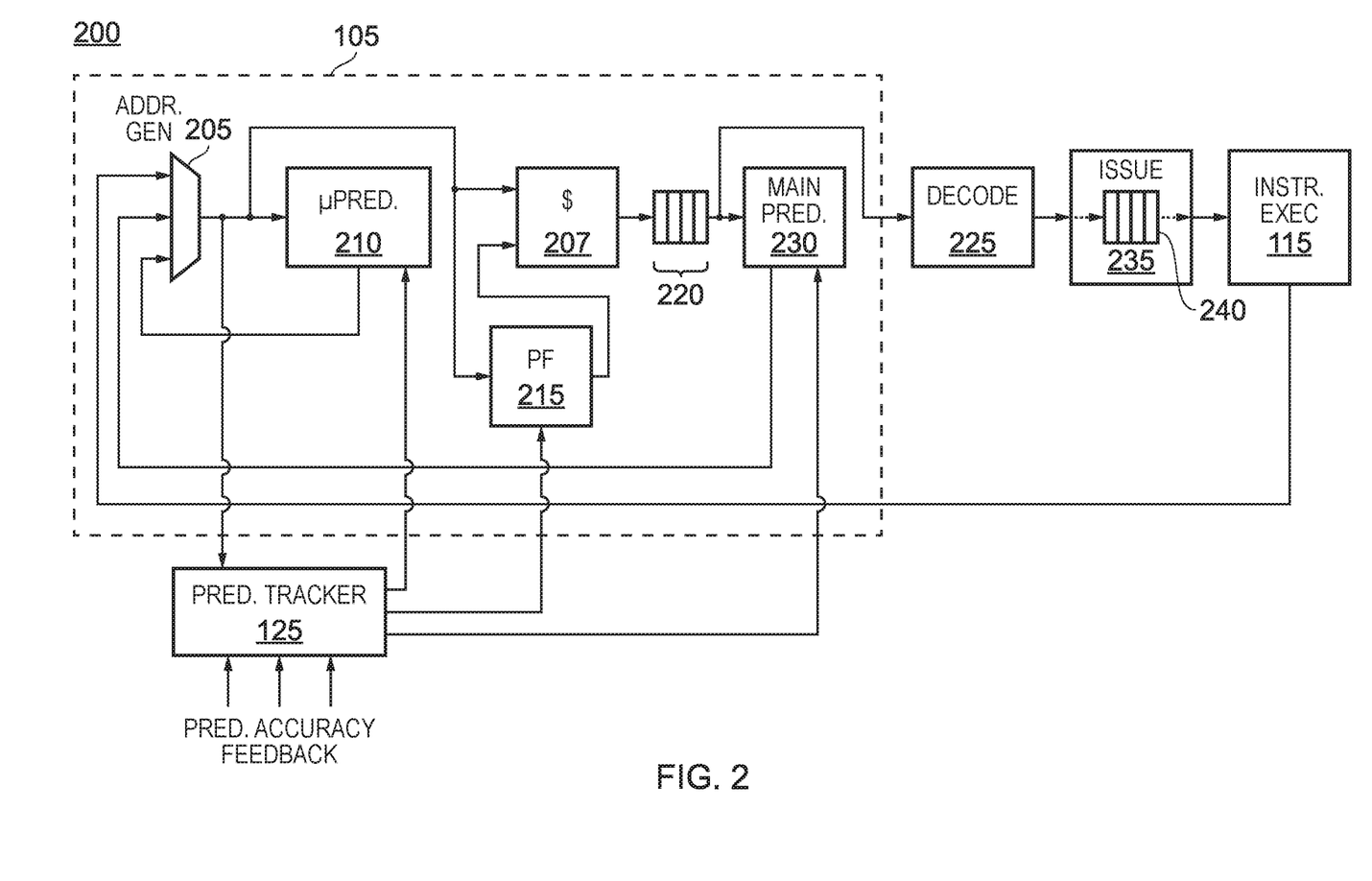
FIG. 2 shows a processing apparatus.

FIG. 2 shows a processing apparatus 200 according to examples of the present disclosure. The apparatus 200 may be seen as a more specific example of the apparatus 100 of FIG. 1.

The apparatus 200 comprises fetch circuitry 105 that is configured to fetch instructions from a memory (not shown in FIG. 2). The fetch circuitry 105 comprises an address generator 205 to generate memory addresses corresponding to instructions to fetch. Each generated memory address is provided to a cache 207, where a lookup is performed in order to determine whether the instruction at that address is stored within the cache. If so then the instruction is output from the cache to the fetch queue 220. In the event of the instruction not being in the cache, it is retrieved by the cache from memory and then provided to the fetch queue 220 (a cache line's worth of instructions will typically be retrieved from memory at this stage and then allocated into the cache 207).

Generated memory addresses are also provided to a micro predictor 210, which is a prediction component 120 as described above in relation to FIG. 1. The micro predictor 210 predicts whether a given generated address corresponds to a branch instruction and, if so, which memory address, or addresses, will be required following that branch. The result is fed back to the address generator 205 so that the predicted address or addresses can be fetched.

Generated memory addresses are also provided to a prediction tracker 125, the use of which therein in described below.

Memory addresses that are provided to the cache 207 are also provided to a prefetcher 215, which is a prediction component 120 as described above in relation to FIG. 1. The prefetcher predicts further instructions that will be required, for example by extrapolating patterns of memory access, and causes the predicted instructions to be retrieved from memory and stored in the cache 207. By such an approach, if the cache subsequently receives an address corresponding to such an instruction from the address generator 205, a hit will be detected in the cache and the corresponding instruction can be passed on from the cache to the fetch queue 220 without needing to access memory at that point.

The instructions provided from the cache to the fetch queue 220 are kept in the fetch queue until they are provided from the fetch circuitry 105 to decode circuitry 225. In addition to being provided to the decode circuitry 225, the instructions are provided to a main predictor 230, which is a prediction component 120 as described above in relation to FIG. 1. The main predictor 230 predicts the outcome of branch instructions and feeds its predictions back to the address generator 205 so that the predicted instructions can be fetched in anticipation of being required. The main predictor 230 can generally make more accurate predictions than the micro predictor 210 because it has access to the content of fetched instructions, whereas the micro predictor 210 has access only to the memory address of a fetched instruction and not its content.

The decode circuitry 225 decodes received instructions into individual processor operations which are provided to issue circuitry 235. The issue circuitry 235 includes an issue queue 240 in which the operations are stored until they are issued to instruction execution circuitry 115. The instruction execution circuitry executes the received operations. In the event of a branch instruction whose outcome is mispredicted by the branch prediction components 210, 230, the execution circuitry can feed back an indication of the misprediction (which can for example be used to update the information used by the branch predictors) and can also feed back to the address generator 205 the next instruction that it requires (which will not have been fetched previously due to the misprediction of the branch instruction by the branch prediction components).

The prediction tracker 125 receives prediction accuracy feedback relating to the accuracy of predictions performed by the micro predictor 210, prefetcher 215 and main predictor 230, which may be referred to as prediction components 120. The prediction tracker 125 uses the received feedback to determine, for each of a plurality of memory address regions, a prediction performance metric for each of the micro predictor 210, prefetcher 215 and main predictor 230. For example, one of these prediction components may be relatively accurate at predicting instructions to be fetched in one memory region, but inaccurate at predicting instructions to be fetched in a different memory region (for example corresponding to a different process).

As noted above, addresses generated by the address generator are provided to the prediction tracker 125. The prediction tracking circuitry 125 determines which of the aforementioned memory regions contains a given received memory address. Based on the prediction performance metrics associated with this region, the prediction tracking circuitry 125 can perform prediction adjustment actions in respect of some or all of the prediction components. For example, a prediction component that has poor accuracy in respect of a currently accessed memory region can be inhibited or deactivated.

The different prediction components can be inhibited in different ways. For example, a component can be inhibited by reducing its prediction distance (i.e. the number operations ahead by which predictions are made). By way of example, this can be effected by reducing the size of the fetch queue 220 (in the case of the micro predictor 210) or by reducing the size of the issue queue 240 (in the case of the main predictor 230). The inhibition can be performed in a granular fashion: for example, prediction tracking metrics could be stored for the micro predictor 210 and main predictor 230 to track prediction accuracy in respect of particular branch types such as conditional branches and indirect branches. If inaccuracy is determined in respect of one branch type, prediction can be inhibited in respect of that branch type but not in respect of other branch types.

The prediction accuracy feedback that is provided to the prediction tracker 125 can take various forms. For example, following a branch prediction by the micro predictor 210 or main predictor 230, prediction accuracy feedback can be provided indicating whether the predicted branch was actually followed. For the main predictor, this feedback may come from the execution circuitry 115 to indicate when the main predictor has mispredicted a branch outcome. For the micro predictor this feedback may come from the main predictor, when the main predictor notes that a prediction made by the micro predictor is inaccurate. As another example, the accuracy of the prefetcher 215 can be tracked by determining, when an entry is retrieved from the cache 207, whether that entry originated from a direct request from the address generator 205 or from a prefetch operation of the prefetcher 215: if the entry originated from a prefetch operation, it can be assumed that it was accurately predicted by the prefetcher 215. Conversely, if it originated from a direct request by the address generator 205 (and thus was not prefetched), it can be assumed that the prefetcher 215 performed inaccurately in respect of that entry.

The above description relates to tracking of prediction performance based on memory regions. Prediction performance can also, alternatively or additionally, be tracked based on other execution regions. Examples of other execution regions include execution contexts, such as trust levels associated with executed instructions or exception levels of operation of the apparatus 200. Another example of an execution region is an application identifier associated with executed instructions, identifying an application to which given instructions correspond. A further example of an execution region is a virtual machine identifier associated with executed instructions, identifying a virtual machine that is running the application that executes a given instruction.

Figure 3:
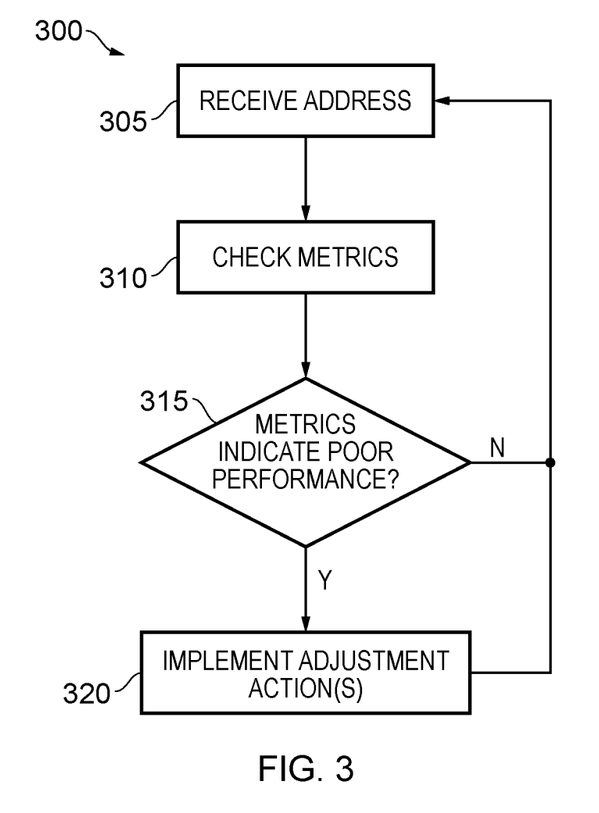
FIG. 3 depicts a method for determining whether to implement prediction adjustment actions.

FIG. 3 depicts a method 300 for determining whether to implement prediction adjustment actions. The method may be implemented in the prediction tracker 125 of apparatuses 100, 200 described above in relation to FIGS. 1 and 2.

At block 305, an address is received. The address corresponds to an instruction that is to be fetched.

At block 310, prediction performance metrics are checked in respect of an execution region or regions to which the instruction belongs. As described above, examples of execution regions include memory address ranges and execution contexts.

At block 315, it is determined whether the metrics indicate poor performance of at least one prediction component. If not, flow returns to block 305 and the method restarts.

If the metrics do indicate poor performance of at least one component, flow proceeds to block 320 where one or more prediction adjustment actions are performed in respect of the poorly performing components. Flow then returns to block 305 and the method restarts.

Figure 4:
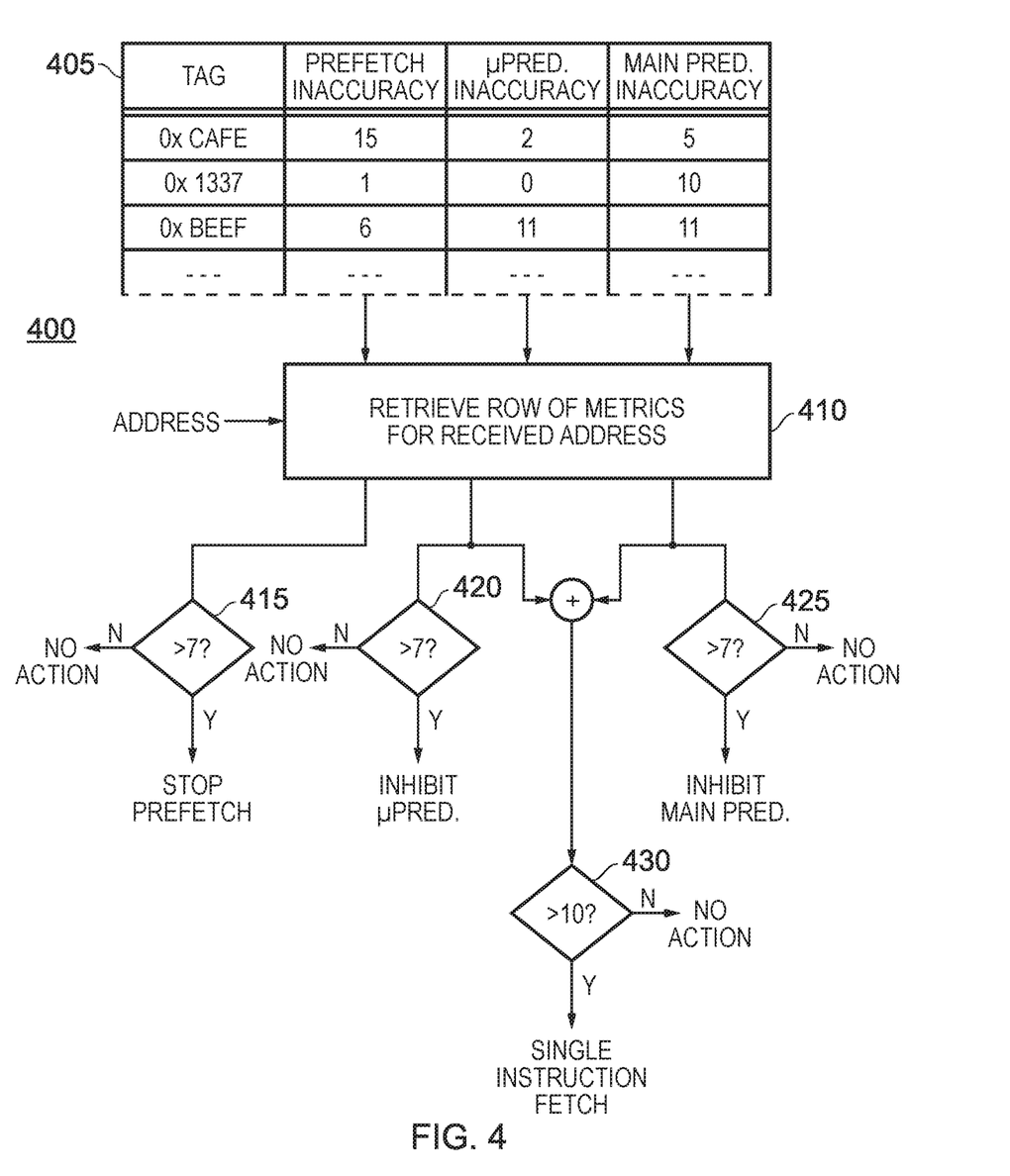
FIG. 4 depicts a method for determining prediction adjustment actions to perform based on prediction performance metrics.

FIG. 4 depicts a method 400 for determining prediction adjustment actions to perform based on prediction performance metrics. The method may be implemented in the prediction tracker 125 of the apparatuses 100, 200 of FIGS. 1 and 2.

Prediction performance metrics are stored for each of a plurality of memory regions. The metrics are shown as a table 405. The metrics are inaccuracy counters for each of a prefetcher 215, a micro predictor 210 and a main predictor 230. The inaccuracy counters reflect the number of inaccurate predictions made by each of these prediction components for each of a plurality of memory regions. Each memory region is identified by a set of tag bits. For example, the table 405 shows that for the memory region corresponding to tag bits 0xCAFE, the prefetcher 215 has made 15 inaccurate predictions, the micro predictor 210 has made 2 inaccurate predictions, and the main predictor 230 has made 5 inaccurate predictions.

A memory address, corresponding to an instruction for execution, is received at block 410. The corresponding row of table 405 is then retrieved.

Based on the values in the retrieved row, various actions can be performed. The following example assumes that the received memory address is in the region corresponding to tag bits 0xCAFE.

At block 415, it is determined whether the prefetch inaccuracy is greater than 7 (the choice of values for decision blocks 415, 420, 425, 430 is dependent on implementation and the figures shown in FIG. 4 are purely for illustration purposes). If so, the prefetching is stopped, i.e. the prefetcher 215 is deactivated. If not, no action is taken in respect of the prefetcher 215. In the present example, the prefetch inaccuracy is 15, and so the prefetching is stopped.

At block 420, it is determined whether the micro predictor inaccuracy is greater than 7. If so, the micro predictor 210 is inhibited. If not, no action is taken. In the present example, the micro predictor inaccuracy is 2, and so no action is taken.

At block 425, it is determined whether the main predictor inaccuracy is greater than 7, If so, the main predictor 230 is inhibited. If not, no action is taken, In the present example, the main predictor inaccuracy is 5, and so no action is taken.

At block 430, it is determined whether the sum of the micro predictor inaccuracy and the main predictor inaccuracy is greater than 10. If not, no action is taken. If so, a single instruction fetch mode is activated. In this mode, only one instruction is fetched at once (as opposed to, for example, fetching 4 instructions at once). This allows inhibition of the micro and branch predictors, such that waste of resources from inaccurate predictions is reduced, whilst still allowing some prediction to be performed. In the present example, the sum of the micro predictor inaccuracy and main predictor inaccuracy is 7, and so no action is taken.

Figure 5:
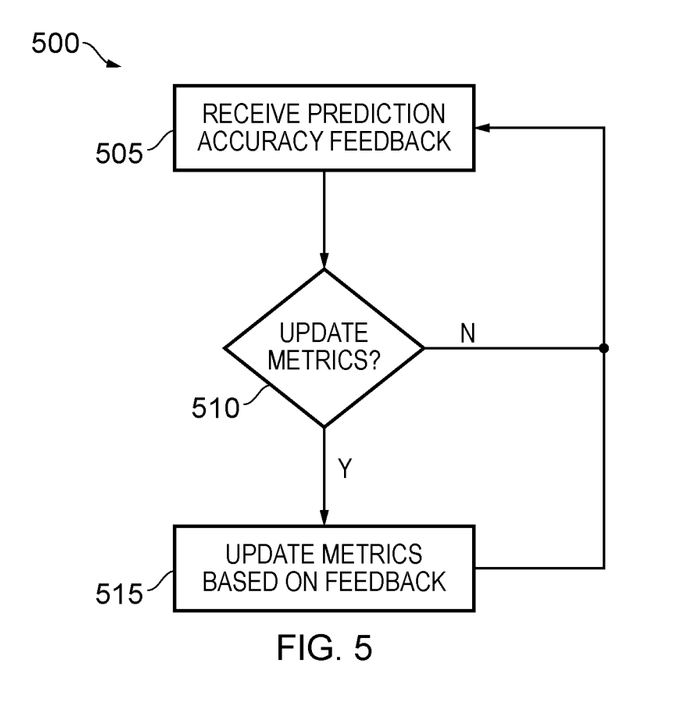
FIG. 5 depicts a method for updating prediction performance metrics.

FIG. 5 depicts a method 500 for updating prediction performance metrics. The method 500 may be implemented in the prediction tracker 125 of the apparatuses 100, 200 of FIGS. 1 and 2.

At block 505, prediction accuracy feedback is received. For example, as described in more detail above, this may include indications that given prediction components have made accurate or inaccurate predictions.

At block 510, it is determined whether to update prediction performance metrics. For example, when the prediction accuracy feedback indicates that a given prediction component has made an accurate prediction, an accuracy counter for that component could be incremented but an inaccuracy counter would not be incremented. In particular examples, one or both of an accuracy counter and an inaccuracy counter may be implemented. For example, where both counters are implemented, both counters may be incremented as described above. Conversely, a single counter may be implemented, which is incremented following an accurate prediction and decremented following an inaccurate prediction (or vice-versa). As a further example, a single counter may be implemented which is incremented in response to one of an accurate prediction and an inaccurate prediction, with no action being taken in response to the other of accurate and inaccurate prediction.

If no metrics are to be updated, flow returns to block 505 and the method 500 restarts.

Otherwise, flow proceeds to block 515. At block 515, the prediction performance metrics identified at block 510 are updated. Flow then returns to block 505 and the method 500 restarts.

Figure 6:
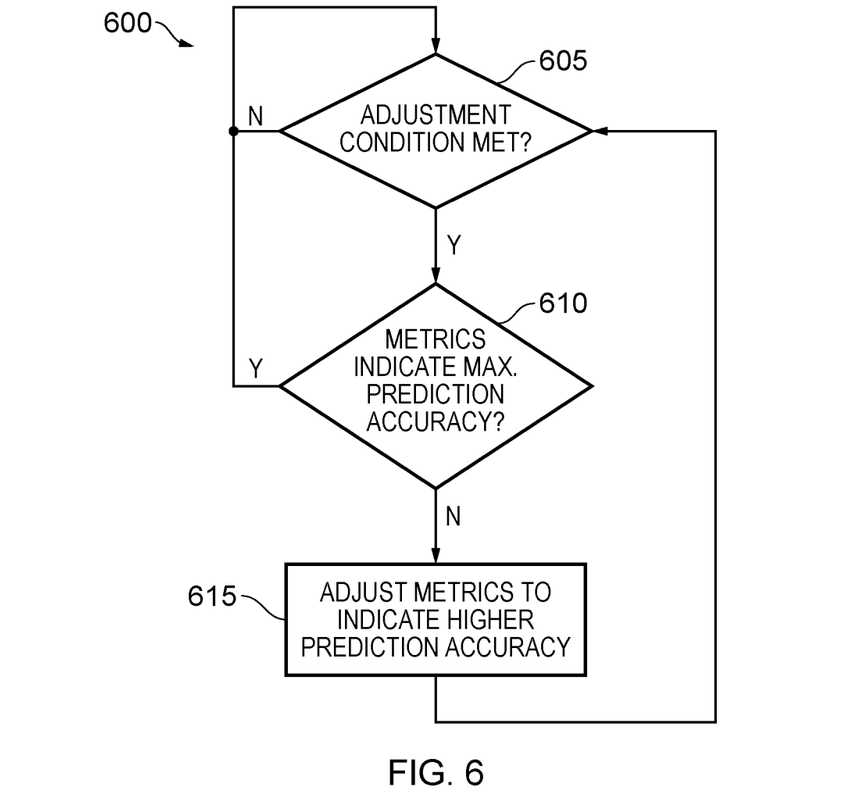
FIG. 6 depicts a method for adjusting prediction performance metrics.

FIG. 6 depicts a method 600 for adjusting prediction performance metrics, to reduce the impact thereon of previous inaccurate predictions. This allows a prediction component that was previously inhibited to become de-inhibited if its level of inaccuracy improves, such that the inhibition is not permanent. The method may be implemented in the prediction tracker 125 of the apparatuses 100, 200 of FIGS. 1 and 2.

At block 605, no action is performed until an adjustment condition is met. For example, the adjustment condition may be that a periodic timer has expired such that the adjustment condition is met on a regular periodic basis. When the adjustment condition is met, flow proceeds to block 610.

At block 610, it is determined whether all prediction performance metrics already show a maximum accuracy. If so, flow returns to block 605 and the method repeats. Otherwise, flow proceeds to block 615.

At block 615, any metrics that do not already show maximum prediction accuracy are adjusted to indicate a higher accuracy. For example, where the metrics are counters of inaccurate predictions, the adjustment may include decrementing each counter by a determined amount.

A given component that had been inhibited due to high inaccuracy can thus, if its accuracy returns to an acceptable level for a period of time, be de-inhibited. If the prediction component remains inaccurate, such that for example the incrementing of an inaccuracy counter following inaccurate predictions outpaces the above-described decrementing, the component will remain inhibited.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   instruction execution circuitry;
   fetch circuitry to fetch, from memory, instructions for execution by the instruction execution circuitry, wherein:
   the fetch circuitry comprises a plurality of prediction components, each prediction component being configured to predict instructions in anticipation of the predicted instructions being required for execution by the instruction execution circuitry; and
   the fetch circuitry is configured to fetch instructions in dependence on the predicting, and
   prediction tracking circuitry to maintain, for each of a plurality of execution regions, a prediction performance metric for each prediction component, wherein the fetch circuitry is configured, based on at least one of the prediction performance metrics for a given execution region, to implement a prediction adjustment action in respect of at least one of the prediction components, wherein the prediction tracking circuitry is configured to, following adjustment of at least one of the prediction performance metrics to indicate a reduced prediction accuracy:

responsive to expiry of a periodic metric adjustment timer, adjust any of said prediction performance metrics, which do not indicate a maximum prediction accuracy, to indicate a higher prediction accuracy.

2. An apparatus according to claim 1, wherein each execution region is a range of memory addresses associated with the memory.

3. An apparatus according to claim 1, wherein each execution region is an execution context of the instruction execution circuitry.

4. An apparatus according to claim 3, wherein each execution context comprises one or more of the members of the group consisting of:
   a trust level associated with executed instructions;
   an exception level of operation of the apparatus;
   an application identifier associated with executed instructions; and
   a virtual machine identifier associated with executed instructions.

5. An apparatus according to claim 1, wherein the fetch circuitry is configured to implement the prediction adjustment action responsive to a determination, based on said at least one of the prediction performance metrics for the given execution region, of poor performance of said at least one prediction component in respect of the given execution region.

6. An apparatus according to claim 5, wherein:
   each of said at least one prediction performance metric for the given execution region comprises a numerical representation of prediction accuracy of a corresponding one of said at least one prediction component in the given execution region; and
   the determination of poor performance of a given one of said at least one prediction component comprises comparing the corresponding numerical representation of prediction accuracy with a predetermined threshold.

7. An apparatus according to claim 5, wherein the prediction adjustment action comprises inhibiting said at least one prediction component.

8. An apparatus according to claim 7, wherein inhibiting said at least one prediction component comprises one or more of the members of the group consisting of:
   deactivating said at least one prediction component;
   reducing a prediction distance of said at least one prediction component; and
   de-emphasising said at least one prediction component relative to other prediction components of the plurality of prediction components.

9. An apparatus according to claim 5 wherein, subsequent to the determination of poor performance:
   the fetch circuitry is configured to implement a further prediction adjustment action responsive to a further determination, based on said at least one of the prediction performance metrics for the given execution region, of acceptable performance of said at least one prediction component in respect of the given execution region; and
   the further prediction adjustment action comprises de-inhibiting said at least one prediction component.

10. An apparatus according to claim 1, wherein the prediction tracking circuitry is configured to, responsive to the expiry of the periodic metric adjustment timer, adjust each of the plurality of prediction performance metrics maintained by the prediction tracking circuitry to indicate a higher prediction accuracy.

11. An apparatus according to claim 1, wherein the prediction tracking circuitry is configured to update the prediction performance metric, for the given execution region for said at least one prediction component, responsive to prediction accuracy feedback.

12. An apparatus according to claim 11, wherein the prediction accuracy feedback comprises one or more of the members of the group consisting of:
   an indication of an accurate prediction by said at least one prediction component for the given execution region; and
   an indication of an inaccurate prediction by said at least one prediction component for the given execution region.

13. An apparatus according to claim 1, wherein the plurality of prediction components comprises instruction prefetch circuitry to prefetch instructions into a cache storage of the apparatus.

14. An apparatus according to claim 13, wherein the prediction performance metric for the instruction prefetch circuitry for a given execution region comprises a representation of a number of cache misses in respect of the given execution region.

15. An apparatus according to claim 1, wherein the plurality of prediction components comprises branch prediction circuitry to predict the outcome of branch instructions prior to the execution of said branch instructions.

16. An apparatus according to claim 15, wherein the prediction adjustment action comprises one or more of the members of the group consisting of:
   reducing the size of a fetch queue of the apparatus; and
   reducing the size of an issue queue of the apparatus.

17. An apparatus according to claim 1, wherein the prediction tracking circuitry is one of:
   implemented in dedicated circuitry; or
   implemented as an extension of circuitry having functionality other than prediction tracking.

18. A method comprising:
   fetching, from memory, instructions for execution by an instruction execution circuitry, wherein:
      the fetching utilises a plurality of prediction components, each prediction component being configured to predict instructions in anticipation of the predicted instructions being required for execution by the instruction execution circuitry; and
      the fetching is in dependence on the predicting, and
      maintaining, for each of a plurality of execution regions, a prediction performance metric for each prediction component; and
   based on at least one of the prediction performance metrics for a given execution region, performing a prediction adjustment action in respect of at least one of the prediction components,
   wherein a prediction tracking circuitry is configured to, following adjustment of at least one of the prediction performance metrics to indicate a reduced prediction accuracy:
      responsive to expiry of a periodic metric adjustment timer, adjust any of said prediction performance metrics, which do not indicate a maximum prediction accuracy, to indicate a higher prediction accuracy.

* * * * *